Dec. 16, 1969     W. W. WOODS     3,483,743

FORCE TRANSDUCER

Filed Nov. 20, 1967

INVENTOR
WEIGHTSTILL W. WOODS
BY
Lee R. Murchison
AGENT

United States Patent Office 3,483,743
Patented Dec. 16, 1969

3,483,743
FORCE TRANSDUCER
Weightstill W. Woods, Redmond, Wash., assignor to The Boeing Company, Seattle, Wash., a corporation of Delaware
Filed Nov. 20, 1967, Ser. No. 684,280
Int. Cl. G01l 5/12; H01f 21/02; G01r 33/00
U.S. Cl. 73—141                                           7 Claims

ABSTRACT OF THE DISCLOSURE

Two opposing U-shaped loading members $10a$, $10b$ (preferred embodiment) are interlaced and bolted to the inside of a hollow, cylindrical sheet of magnetostrictive material 12. Small groups of holes 14 positioned between the loading members and penetrating the cylindrical sheet 12, support mutually normal A.C. input-output coils 16 whose coupling is controlled principally by shear stress created in the sheet 12 between the loading members $10a$, $10b$ by tensile or compressive loading between the opposing loading members $10a$, $10b$.

BACKGROUND OF THE INVENTION (FIELD)

This invention relates to magnetostrictive force transducers, and more particularly, to magnetostrictive force transducers capable of accepting low-to-very-large tensile and compressive force loading while providing a very linear and symmetrical output about the no-load position.

BACKGROUND OF THE INVENTION (PRIOR ART)

U.S. Patent No. 2,895,332 by Dahle et al. discloses the use of perpendicularly crossed coils whose coupling (A.C.) is controlled by the force exerted upon the coil support structure comprised of a magnetostrictive material. Thus, a force transducer is created whereby an electrical signal variation due to the controlled coupling of the crossed coils is provided. A further development of structure relating to magnetostrictive force transducers is given in U.S. Patent No. 3,224,101 by O. W. Ohlsson where, in column 1 of that patent the problem of non-linearity of A.C. signal output with increased load where the load is small is discussed at length and one means of correction for this is mentioned, viz., compensation by means of an auxiliary load.

Another force transducer of the prior art is the strain gage which is designed for high strain levels, therefore necessitating attendant mechanical fragility which is undesirable in highly stressed structures such as aircraft landing gears. Strain gage load cells also have low power output, requiring extensive electronic amplification for adequate display. Further, thermal expansion of materials will cause extensive zero shift of strain gage load cells unless complex compensation methods are employed.

Fluid pressure cells have also been used in aircraft landing gear oleos and are somewhat less fragile than strain gages. However, fluid pressure load cells suffer from mechanical friction in the oleos which results in questionable accuracy. Signal power output from fluid pressure cells is also generally low.

Thus, previous load transducers have in one manner or another experienced various limitations in their operative capabilities which the subject invention minimizes, avoids or eliminates.

OBJECTS

Accordingly, an important object of this invention is to provide an improved force transducer suitable for use in weighing, force determination and accelerometry applications.

A further important object of this invention is to provide a force transducer which is very linear in its response to small loads.

A further important object is to provide a force transducer having both linear and symmetrical response in the region from tension loading to no-load to compressive loading.

A further object of this invention is to provide an improved magnetostrictive force transducer using a sheet of magnetostrictive material formed into a cylindrical member.

A further object of this invention is to provide an apparatus embodying a method of transduction of values of tensile and compressive force into corresponding linearly related values of an electrical signal.

SUMMARY OF THE INVENTION

In accordance with the teachings of the present invention the above advantages and objects are achieved in a broad aspect of this invention wherein opposing pluralities of fingers $10a$, $10b$ are both attached to a common sheet 12 of magnetostrictive material in a spaced interlaced manner. A.C. input-output coils 16 are looped through holes in the magnetostrictive-material sheet 12 and a force F to be measured is loaded through the sheet via the pluralities of metallic fingers $10a$, $10b$ and the force-created, stress-induced anisotropy in the magnetic permeability of the sheet 12 in and around the two coils 16 varies their coupling such that a very linear variation in the amplitude of an A.C. voltage signal coupled through the coils, for a variation in force, is obtained.

In its preferred form, two opposing pluralities of fingers $10a$, $10b$ cylindrically interlace along the inner surface of the magnetostrictive sheet 12 when it is formed into the special case of a mathematical closed surface having an infinite number of sides and known as a cylinder 12.

SHORT DESCRIPTION OF FIGURES

These and other aspects of the present invention will be more clearly understood from the following description when read with reference to the accompanying drawings wherein, FIGURE 1 is an exploded isometric view of a preferred embodiment of the magnetostrictive force transducer of this invention utilizing U-shaped loading member $10a$, $10b$ and a sheet of magnetostrictive material 12 curved to form a cylindrical shell.

Figure 1:
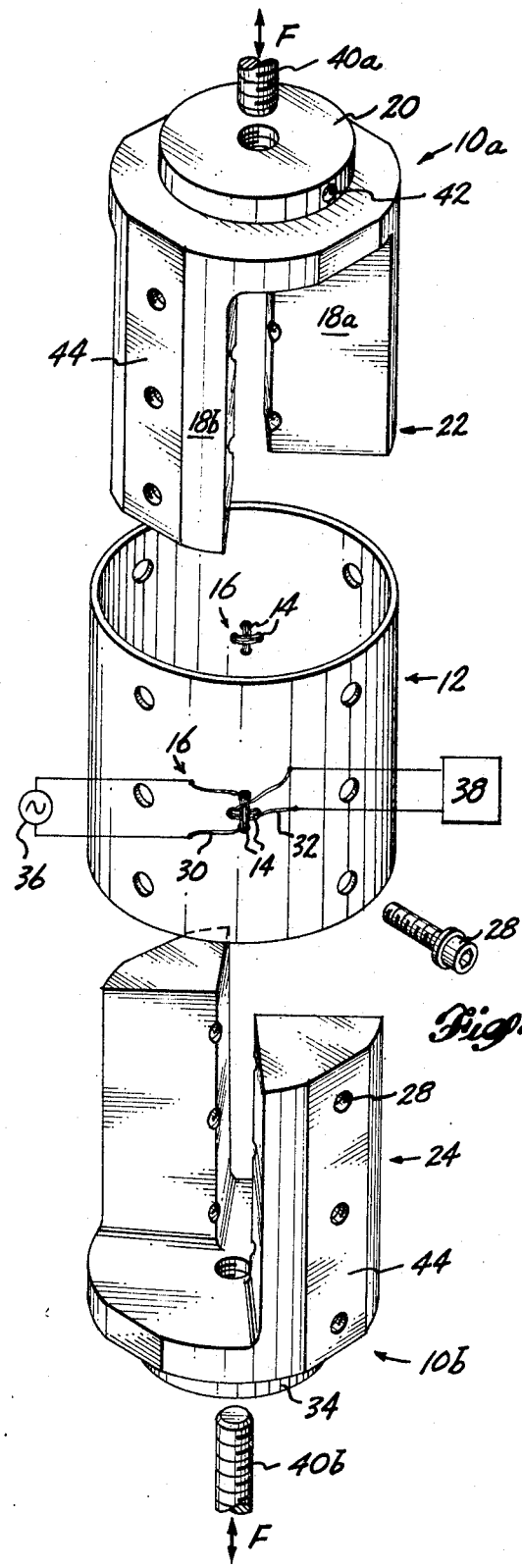
Figure 2:
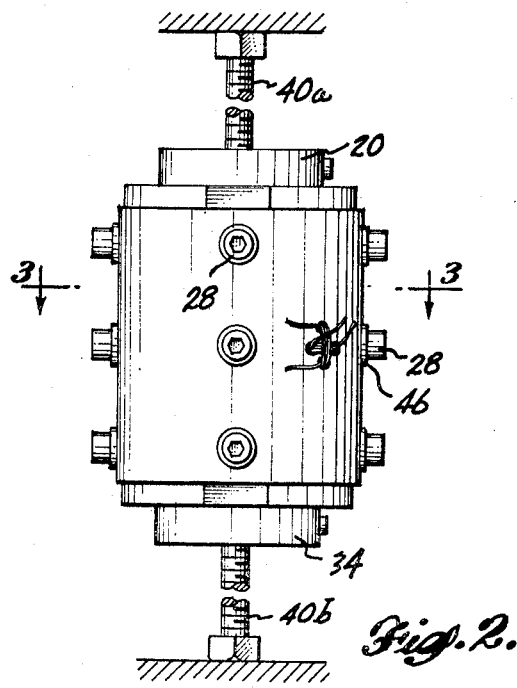
FIGURE 2 is a side orthorgraphic view of the assembled force transducer of FIGURE 1.
Figure 3:
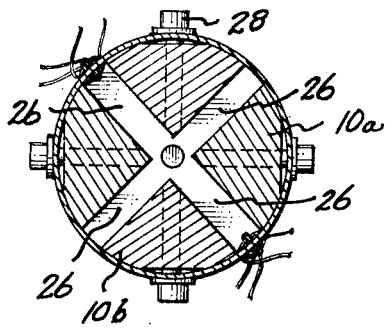
FIGURE 3 is a cross-sectional view taken through the section 3—3 of FIGURE 2 and is provided in order to emphasize the interlacing of the multiple fingers of the loading members $10a$, $10b$ (described as U-shaped in this preferred embodiment) within the hollow cylindrical shell 12.
Figure 4:
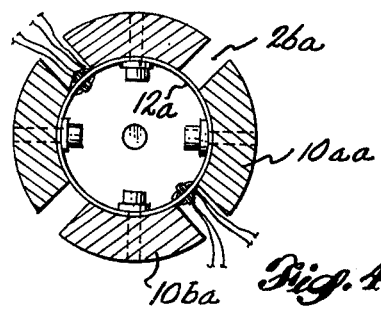

FIGURE 4 is a cross-sectional view corresponding to FIGURE 3, for the placement of the U-shaped members $10a$, $10b$ of FIGURES 1, 2 and 3 on the outside of the magnetostrictive cylindrical sheet 12 instead of inside the sheet 12 as shown for FIGURES 1, 2 and 3.

CONSTRUCTION

Turning now to FIGURES 1, 2 and 3, it is seen that the construction details of a preferred embodiment of this invention are as follows:

Multiple parallel metallic fingers $18a$, $18b$ integrally connected to and cylindrically arranged around a first central core 20 extend beyond the end of the first core 20 in a first cylindrical array 22 forming a first loading member $10a$. A second cylindrical array of fingers 24 forming a second loading member $10b$ is placed opposite the first array 22 and the two arrays 22, 24 are placed together such that the two arrays of fingers interlace with small spaces 26 left between the interlaced fingers. A cylinder 12 formed from a sheet of magnetostrictive material is slipped over the opposing arrays of fingers 22, 24 and the fingers of both arrays are bolted 28 to the inside of the cylinder 12 such that the two arrays 22, 24 and the cylinder become an integral unit.

Four rectangularly-positioned holes 14 extend through the cylinder 12 between any two of the opposing fingers 22, 24. A first (primary) input coil 30, is laced through a first two of said four holes 14. A second (secondary) output coil 32, is laced, normally to the first coil, through the remaining two holes. Several such input-output coil arrangements, located between various opposing fingers, may be used in combination (i.e., input coils series connected and the output coils series connected).

For convenience in description in connection with the figures, the first central core 20 is shown loaded or attached to the load force F by a first bolt 40a as is also the second central core 34 by a second bolt 40b. A set screw 42 may be used to secure the bolts in place. The U-shaped members 10a, 10b are shown to have slightly flattened sides 44 for cooperating with the flat washers 46 placed on the opposite side of the sheet 12 under the heads of the bolts 28 used to secure the sheet 12 to the U-shaped loading members 10a, 10b. However, a washer curved to the cylindrical-sheet 12 shape may be used instead. In which case, the slightly flattened sides 44 would not be used but instead the cylindrical shape would be followed.

FIGURE 4 is a cross-sectional view corresponding to FIGURE 3, showing the placement of the U-shaped members 10a, 10b of FIGURES 1, 2 and 3 on the outside of the magnetostrictive cylindrical sheet 12a instead of inside the sheet 12 as shown for FIGURES 1, 2 and 3. In this case the small spaces 26a between the members are on the outside of the sheet 12a and again the input-output coils 16a are placed through the sheet in the spaces between the members 10aa, 10ba. In FIGURE 4, the additional subscript "a" is added to the reference numeral of the corresponding element of FIGURES 1, 2 and 3 in order to emphasize the equivalent elements of a different arrangement.

A suitable sheet 12 thickness has been found to vary from 0.005 to 0.04 inch which range was found optimum for 60 c.p.s. with mild steel as the cylinder sheet material. The loading members 10a, 10b may be any material suitable to transmit the forces involved with both steel and aluminum being found suitable.

A suitable A.C. power source 36 is 110 volts A.C. 60 c.p.s. with suitable ballasting (either resistance or inductance) to limit and control the peak current flowing through the primary coil to a value which has been found to be that which yields maximum output sensitivity in accordance with the description of the Villari effect as applied to this problem in either (1) "The Torductor and Pressductor," O. Dahle; Ing. Vetenskaps Akad., vol. 25, 1954, pp. 221–238, or (2) "A Precision Torquemeter Based on Magnetic Stress Anisotropy," T. H. Barton and R. J. Ionides; IEEE Transactions on Power Apparatus and Systems, vol. PAS–85, No. 2, February 1966, pp. 152–159.

A suitable detection means 38 is a synchronous detector such as described in Fig. 10.8 on page 174 of "Transistor Circuit Design," edited by Joseph A. Walston and John R. Miller for Texas Instruments, a McGraw-Hill Book Company Inc. publication, where the "Modulator" (of the reference) is replaced by the force transducer of this invention, the "Oscillator" is the power source 36, and the "Input Signal" is the force F being measured and the "Demodulator" is any of the several given on pages 168–175 of that reference. An "A-C Amplifier" (as shown in the Figure 10.8) was not found to be necessary in the laboratory embodiment built.

OPERATION

A force F to be measured (tensile or compressive) is loaded across the opposing arrays of fingers 22, 24 by means of the cores 20, 34 to which the arrays 22, 24 are attached. An A.C. signal is connected to excite the input coil and a variation in the force F causes a corresponding variation in the coupling between the input and output coils 30, 32 thereby causing a variation in the output voltage signal amplitude which corresponds to the variation in force F in a very linear and symmetrical fashion for both compressive and tensile force loading F.

What is claimed is:

1. A force transducer utilizing anisotropic changes in permeability of a magnetostrictive material resulting from force-induced stress changes to control the coupling between a pair of alternating current input-output coils 30, 32 in order to give an alternating voltage output signal amplitude variation from the output coil 32 that is linearly related with the force F changes when the input coil is connected to an alternating current, power source, said force transducer in combination comprising:
   (1) a sheet magnetostrictive material 12 forming a closed continuous surface;
   (2) a first means for transmitting force 10a
      (a) said first means for transmitting force being secured to said sheet of magnetostrictive material;
   (3) a second means for transmitting force 10b
      (a) said second means for transmitting force being spaced adjacent to said first means for transmitting force,
      (b) said second means for transmitting force also secured to said sheet of magnetostrictive material, and
      (c) said first and second means for transmitting force arranged opposing each other in order to communicate tensile and compressive force loading through and across said sheet of magnetostrictive material;
   (4) a plurality of holes 14 perforating said sheet of magnetostrictive material in the space created by said spaced adjacency of said first and second means for transmitting force;
   (5) an input, first coil 30 wound through a first number of said holes; and
   (6) an output, second coil 32 wound through a second number of said holes.

2. A force transducer as defined in claim 1 wherein:
   (a) said sheet of magnetostrictive material 12 forming a closed continuous surface has opposing open ends, and
   (b) said first and second means for transmitting force 10a, 10b each have a plurality of fingers entering the opposing open ends to respectively interlock and conform to the closed surface thereby securing said first and second means for transmitting force to the closed surface sheet of magnetostrictive material.

3. A force transducer as defined in claim 2 wherein said closed surface forms a hollow cylindrical body 12.

4. A force transducer as defined in claim 3 wherein said fingers interlace along the inner surface of said hollow cylindrical body 12.

5. A force transducer as defined in claim 3 wherein said fingers interlace along the outer surface of said hollow cylindrical body.

6. A force transducer as defined in claim 1 and in addition the following two elements:
   (7) an alternating current power source means 36 for providing power to said input coil, and
   (8) detection means 38 connected to said output coil 32 for providing an indication of the magnitude of said tensile and compressive force F loading through and across said sheet of magnetostrictive material 12.

7. A force transducer as defined in claim 6 wherein said detection means is a synchronous detector.

References Cited

UNITED STATES PATENTS

| | | | |
|---|---|---|---|
| 2,895,332 | 7/1959 | Dahle et al. | 73—141 |
| 3,376,537 | 4/1968 | Pugnaire | 73—141 XR |

FOREIGN PATENTS

| | | |
|---|---|---|
| 1,289,183 | 2/1962 | France. |
| 1,315,183 | 12/1962 | France. |

OTHER REFERENCES

Dzygalo: Magnetoelastic Stress Transducer, translated from Izmeritel'naya Tekhnika, No. 1, pp. 33–34, January 1965.

CHARLES A. RUEHL, Primary Examiner

U.S. Cl. X.R.

324—34; 336—20